Jan. 2, 1940. J. S. BOYLE 2,185,701
EXTRUDING APPARATUS
Filed Jan. 23, 1937
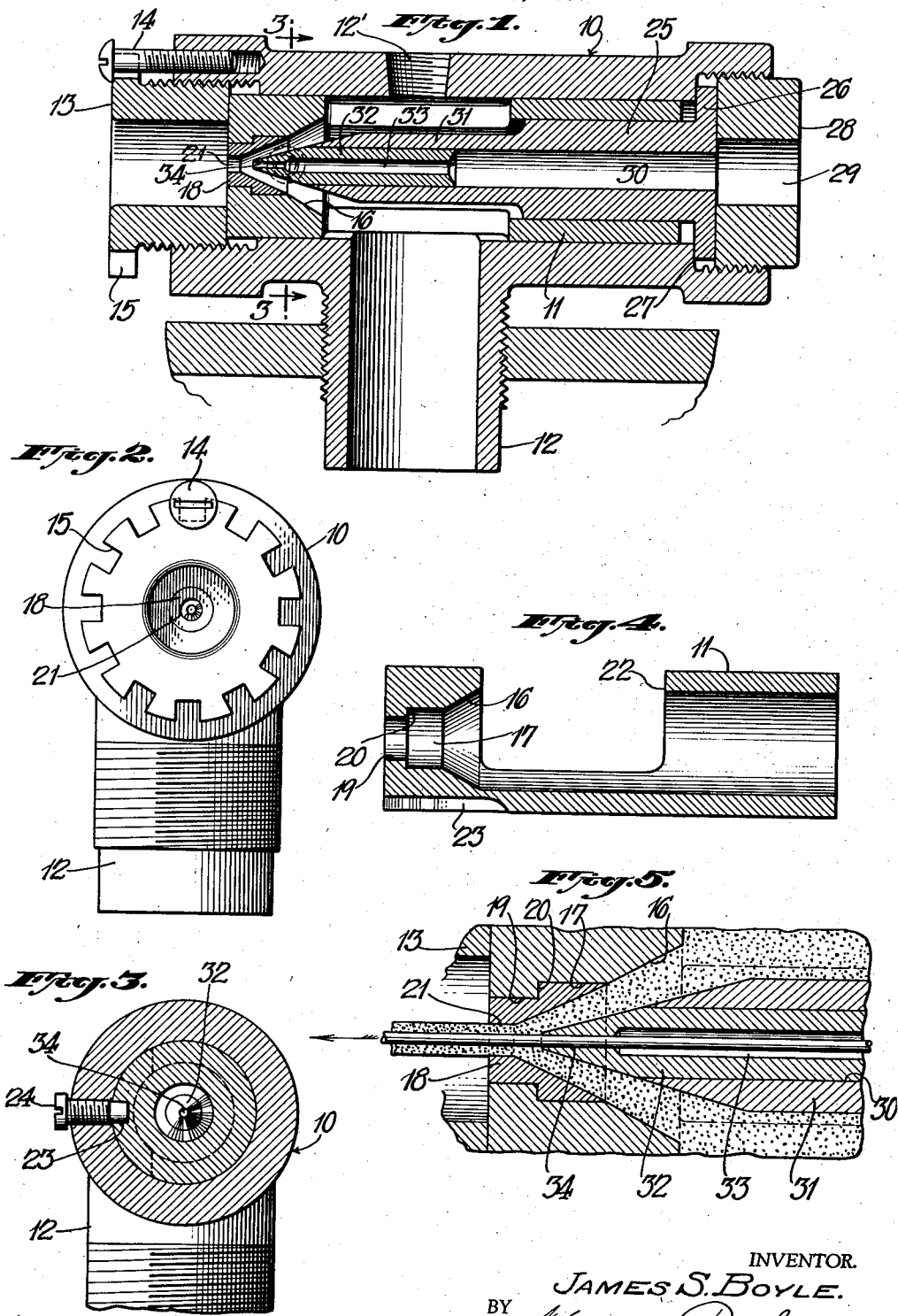
INVENTOR.
JAMES S. BOYLE.
BY
ATTORNEYS Patented Jan. 2, 1940

2,185,701

UNITED STATES PATENT OFFICE 2,185,701

EXTRUDING APPARATUS

James S. Boyle, Marion, Ind., assignor to Anaconda Wire & Cable Company, New York, N. Y., a corporation of Delaware Application January 23, 1937, Serial No. 121,970

2 Claims. (Cl. 18—13)

My invention relates to apparatus for extruding plastic materials as, for example, extruding a sheathing of vulcanizable rubber about a conductor.

In extruding a plastic material about a central wire or conductor, the wire is drawn through a die through which is also forced an annular layer of the plastic material. It is desirable that the conductor be centered exactly in the center of the die so that the space between the conductor and the walls of the die will be equal throughout the circumference and thus result in a sheath of uniform thickness. For this purpose the wire or conductor is guided in and through a wire guide spaced from the extruding die so as to leave a passage for the plastic material.

Heretofore the extruding die and the wire guide have been mounted independently in the housing or body of the extruding head. This arrangement frequently afforded an opportunity for the guide and wire to become off center which, for example, may be caused by a warp of the head or housing, or by other causes.

In my present invention I provide apparatus in which accurate centering of the wire guide relative to the extruding die is ensured to provide a uniform coating of the extruded plastic.

The various features of my invention are illustrated by way of example in the accompanying drawing, in which—

Fig. 1 is a longitudinal section through an extruding head embodying a preferred form of the invention.

Fig. 2 is a front elevation of the head shown in Fig. 1.

Fig. 3 is a vertical section taken on the line 3—3 of Fig. 1.

Fig. 4 is a longitudinal section of a die sleeve forming a part of the extruding apparatus shown in Fig. 1.

Fig. 5 is a longitudinal section on a larger scale of parts of the apparatus at the extruding die.

In my invention I provide a die and guide sleeve which may be removed from the housing or tubing head and which is accurately machined to position both an extruding die and a guide spindle in co-axial but longitudinally displaced position. This die sleeve is mounted in the housing or extruding head and is held in place therein between a pair of adjustable nuts. The housing or extruding head is preferably of a T-shape having a side inlet for the plastic material, and the die sleeve is cut out in a part of its circumference for the passage of the plastic material into the die within the sleeve. The die and wire guide spindle are removably mounted in the die sleeve.

Referring more particularly to the accompanying drawing, the invention is illustrated as applied to an extruding head or housing 10 having a main bore to receive a die sleeve 11 and having a side inlet projection 12 through which plastic material may be forced. The housing is also provided with an overflow opening 12' through which excess plastic may flow under the control of a pressure release valve, not shown. The die sleeve 11 is mounted in the main bore of the extruding head and is held in position by an adjusting nut 13 threaded into the outlet end of the head. By threading the nut inwardly, the die sleeve may be adjusted longitudinally, being held against the nut 13 by the pressure of the plastic material forced into the head. The nut 13 may be held in any position of adjustment by means of a screw 14 threaded into a screw hole in the front face of the extruding head and fitting into one of a series of circumferential notches 15 in the nut. The inner surface of the die sleeve at the outlet end is tapered inwardly as at 16 toward a cylindrical recess 17 in which a die 18 may be mounted, the recess 17 being contracted at 19 to form a shoulder 20 against which the die 18 abuts. The die 18 has a surface tapered to form a continuation of the surface 16 and connecting in an outlet orifice at 21. The die sleeve is cut away at 22 to leave a passage from the inlet tube 12 into the interior of the sleeve and thence to the die. The die sleeve 11 is prevented from turning by means of a longitudinal groove 23 which receives the end of a screw 24.

In the end of the die sleeve 11 opposite the outlet end there is mounted a wire guide spindle 25 having an end flange 26. The flange 26 is engaged between a shoulder 27 on the head 10 and a clamping nut 28. The nut 28 is provided with a central opening 29 through which a wire may enter into a passage 30 in the wire guide spindle. The spindle 25 is accurately positioned in the die sleeve 11 by the close contact of its outer surface with the inner surface of the die sleeve. Its outer diameter is contracted towards the discharge end as at 31 and then tapered to form a conical annular passage within the tapered surface 16. The central passage 30 is very slightly tapered, for example, in a #2 Brown & Sharpe taper and receives a wire guide 32. The wire guide 32 is thus accurately positioned within the wire guide spindle 25. It has a longitudinal passage 33 for the wire to be guided which is contracted as at 34 to the exact outer dimension of the wire.

From the above it will be apparent that the die and the wire guide may be accurately positioned in the die sleeve so as to ensure an exact centering of them. The die may be moved longitudinally relatively to the wire guide after being positioned in the extruding head by rotating the nut 13 in one direction or the other and securing it in position by the screw 14.

Through the above invention, therefore, I have provided an extruding head for extruding apparatus in which the accurate centering of the wire and die is provided, thereby lessening or eliminating the risk of an uneven extrusion or thickness of the plastic material.

What I claim is:

1. Apparatus for extruding plastic material about a wire which comprises a housing having a passage extending therethrough and open at its opposite ends and an intermediate side opening thereinto, a die sleeve slidably mounted in said housing and having an extruding die at one end and tapered surfaces from said die to the interior of said sleeve, an adjustable means on said housing to limit the position of said sleeve, a guide spindle slidably mounted in said sleeve, a wire guide in said spindle and having a tapered outward surface centered relatively to and spaced from the tapered surface of said die, the opposite end of said spindle having an outwardly extending flange, means for clamping said flange against a surface of said housing, said sleeve having a side passage communicating with the side passage of said housing.

2. Apparatus for extruding plastic material about a wire which comprises a housing having a cylindrical passage through which the wire passes and a side opening into said passage, a sleeve in said passage having an opening communicating with said side opening, a die at one end of said sleeve, an adjustable stop in said housing to position the die end of said sleeve, said sleeve and die having a tapered inner opening, a guide wire spindle slidably mounted in said sleeve and having a wire guide centered axially of said die, said spindle having an outwardly projecting flange and said housing having a shoulder against which said flange abuts and means for holding said flange tightly against said shoulder.

JAMES S. BOYLE.